United States Patent [19]

Damm et al.

[11] Patent Number: 5,364,192
[45] Date of Patent: Nov. 15, 1994

[54] DIAMOND BEARING ASSEMBLY

[76] Inventors: Oliver F. R. A. Damm, 633 Turf Street, Wingate Park, Pretoria, Transvaal; Klaus Tank, 9 Warbleton Avenue, Essexwold, Johannesburg, Transvaal, both of South Africa

[21] Appl. No.: 142,041

[22] Filed: Oct. 28, 1993

[30] Foreign Application Priority Data

Oct. 28, 1992 [ZA] South Africa .................. 92/8326
Oct. 28, 1992 [ZA] South Africa .................. 92/8327

[51] Int. Cl.⁵ ............................................. F16C 17/04
[52] U.S. Cl. ........................... 384/420; 384/907.1; 384/317; 384/304
[58] Field of Search ............ 384/317, 420, 907.1, 384/913, 424

[56] References Cited

U.S. PATENT DOCUMENTS

| | | |
|---|---|---|
| 4,410,054 | 10/1983 | Nagel et al. . |
| 4,468,138 | 8/1984 | Nagel . |
| 4,560,014 | 12/1985 | Geczy . |
| 4,620,601 | 11/1986 | Nagel . |
| 4,662,348 | 5/1987 | Hall et al. . |
| 4,708,496 | 11/1987 | McPherson . |
| 4,729,440 | 3/1988 | Hall . |
| 4,802,539 | 2/1989 | Hall . |
| 5,092,687 | 3/1992 | Hall . |

FOREIGN PATENT DOCUMENTS

| | | |
|---|---|---|
| 0198112 | 10/1986 | European Pat. Off. . |
| 0283982 | 9/1988 | European Pat. Off. . |
| 2932416 | 2/1980 | Germany . |
| WO87/07343 | 12/1987 | WIPO . |

*Primary Examiner*—Lenard A. Footland
*Attorney, Agent, or Firm*—Oblon, Spivak, McClelland, Maier & Neustadt

[57] ABSTRACT

The invention concerns a diamond thrust bearing assembly for a downhole motor. The assembly (10) includes at least one set of opposing bearing rings (20, 22), each of which has an annular support element (24, 30) and a plurality of PCD compacts (48, 62) carried in circumferentially spaced relationship by the support element. The PCD compacts present opposing bearing surfaces (52, 66) with the bearing surfaces (66) of the compacts of one bearing ring in each set being circumferentially longer than the bearing surfaces (52) of the compacts of the other bearing ring of the set.

17 Claims, 4 Drawing Sheets

DIAMOND BEARING ASSEMBLY

BACKGROUND TO THE INVENTION

THIS invention relates to a diamond bearing assembly.

One application of the diamond bearing assembly of the invention is in a downhole motor as used in the drilling industry. Conventional thrust bearing assemblies as employed in downhole drilling motors use rolling element bearings or plain bearings. In the case of a plain bearing, steel thrust rings slide on elastomeric pads, and such bearings are usually arranged in stacks to take the imposed axial thrust. One disadvantage of stacked bearings of this kind is the fact that the bearing assembly has a considerable length, rendering it unsuitable for negotiating tight bends in directional drilling applications.

A further disadvantage, suffered both by roller bearings and plain bearings, arises from the fact that the bearing assembly is exposed in use to the drilling fluid or mud that powers the motor. The abrading action of the fluid on the bearing components wears them out rapidly, necessitating frequent replacement or refurbishment and considerable downtime.

For these reasons, it has been proposed to employ diamond compacts as thrust bearing components, since it is recognised that such components will generate relatively low frictional forces and have the ability to withstand high thrust loads.

SUMMARY OF THE INVENTION

According to the present invention, there is provided a diamond thrust bearing assembly for a downhole motor, the assembly comprising at least one set of opposing bearing rings, each bearing ring comprising an annular support element and a plurality of PCD compacts carried in circumferentially spaced relationship by the support element, the PCD compacts presenting opposing bearing surfaces with the bearing surfaces of the compacts of one bearing ring in each set being circumferentially longer than the bearing surfaces of the compacts of the other bearing ring of the set.

In this specification, "PCD" refers to polycrystalline diamond. "PCD compact" refers to a polycrystalline diamond compact which consists of a mass of diamond particles, generally present in an amount of more than 70% by volume of the compact, bonded under diamond synthesis conditions. The compact may have a second phase which can optionally contain or consist of a diamond solvent/catalyst. "Composite PCD compact" or "composite compact" refers to a PCD compact on a cemented carbide or other suitable substrate.

In a preferred embodiment, the PCD compacts are provided by composite PCD compacts secured to the bearing rings.

Preferably also, the composite PCD compacts of one bearing ring in each set are of round cylindrical form, and the composite PCD compacts of the other bearing ring in the set are of elongate, part-annular shape. The circumferential length of each part-annular composite compact may be substantially greater than the diameter of a round cylindrical composite compact.

It is also preferred that the composite compacts of each set of opposing bearing rings be located and secured in complemental pockets in their respective support elements, the part-annular composite compacts projecting further from their pockets than the round cylindrical composite compacts.

There are preferably circumferential gaps between the composite compacts of each ring, to permit radial passage of drilling fluid.

In the preferred versions of the invention, each PCD compact has a flat bearing surface circumscribed by a chamfered edge. The chamfered edge of each compact can include a shallow chamfer making an angle of less than 45°, preferably in the range 1° to 10°, most preferably about 5°, with the flat bearing surface of the compact. The chamfered edge may also include, located outwardly of the shallow chamfer, a further chamfer making a steeper angle with the flat bearing surface than the shallow chamfer. The latter chamfer is provided to prevent edge chipping.

Either or both of the chamfers can have a curved as opposed to straight cross-sectional shape.

The diamond thrust bearing assembly may comprise two sets of opposing bearing rings.

Furthermore, the diamond thrust bearing assembly may be arranged such that PCD compacts with circumferentially longer bearing surfaces are carried by a support element adapted to be anchored to a rotatable driveshaft of the downhole motor while PCD compacts with circumferentially shorter bearing surfaces are carried by a support element which is adapted to be anchored to a stationary bearing housing of the downhole motor.

The invention extends to a downhole motor comprising a diamond thrust bearing assembly as described above.

BRIEF DESCRIPTION OF THE DRAWINGS

The invention will now be described in more detail, by way of example only, with reference to the accompanying drawings in which.

DESCRIPTION OF AN EMBODIMENT

Figure 1:
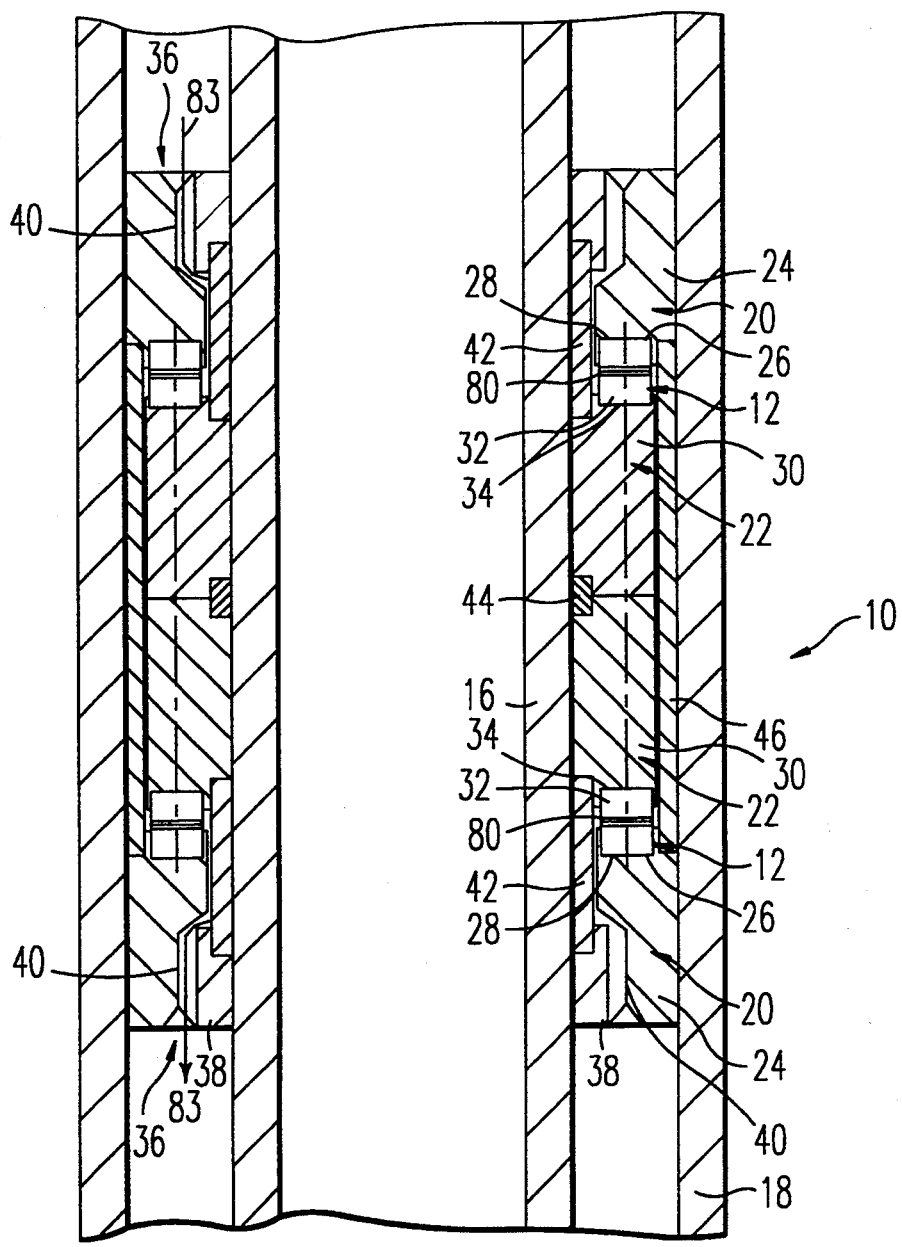
FIG. 1 shows the general arrangement of a downhole motor bearing assembly incorporating diamond bearing assemblies of the invention.

FIG. 1 illustrates the general arrangement of a downhole motor bearing assembly 10 which incorporates two diamond thrust bearing assemblies 12 of the invention.

As shown in FIG. 1, there is a central tubular downhole motor driveshaft 16 located rotatably within a tubular bearing housing 18, with the downhole motor bearing assembly 10 located and providing for relative rotation between the shaft and housing. Components above and below the actual bearing assembly 10 are not illustrated. Those skilled in the art will nevertheless recognise that the driveshaft 16 is rotated by the action of the downhole motor and supplies rotary drive to a drill bit. The housing 18 remains stationary.

The diamond thrust bearing assemblies 12 are provided by a pair of outer bearing rings 20 and a pair of inner bearing rings 22. Each outer bearing ring 20 is composed of an annular, sintered tungsten carbide support element 24 and a series of composite PCD compacts 26 which are located and secured in complemental pockets 28 formed in an end surface of the element.

Each inner bearing ring 22 is composed of an annular sintered tungsten carbide support element 30 and a series of composite PCD compacts 32 which are located and secured in complemental pockets 34 formed in an end surface of the element. Further details about the nature of the bearing rings 20 and 22 are given below.

The assembly 10 also includes two radial bearing assemblies, indicated generally with the numeral 36. Each of these assemblies includes a rotating radial bearing ring 38 which runs, at a bearing interface 40, against a portion of the support element 24 of an outer bearing ring 20.

The assembly 10 also includes radially inner spacer rings 42 and 44 and a radially outer spacer ring 46. In practice, an axial compressive force is applied by external locknuts (not illustrated) to the radially outer components of the assembly 10, i.e. to the bearing rings 20 and the spacer ring 46. The compressive force locks the bearing rings 20 and spacer ring 46 frictionally to one another and to the bearing housing 18.

At the same time, locknuts apply an axial compressive force to the radially inner components of the assembly 10, i.e. to the radial bearing rings 38, spacer rings 42, bearing rings 22 and spacer ring 44. In this case, the applied compressive force locks the components 38, 42, 22 and 44 to one another and to the driveshaft 16, so that when the driveshaft is rotated by the action of the motor, these components rotate with it.

Figure 2:
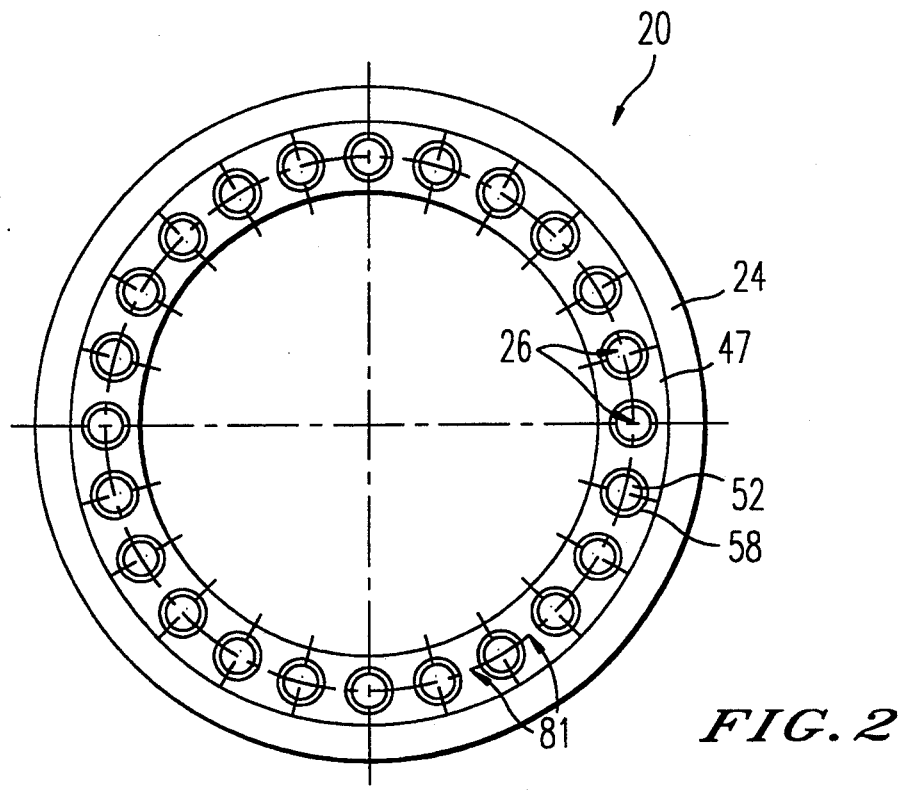
FIG. 2 shows a face view of an outer, fixed bearing ring.
Figure 3:
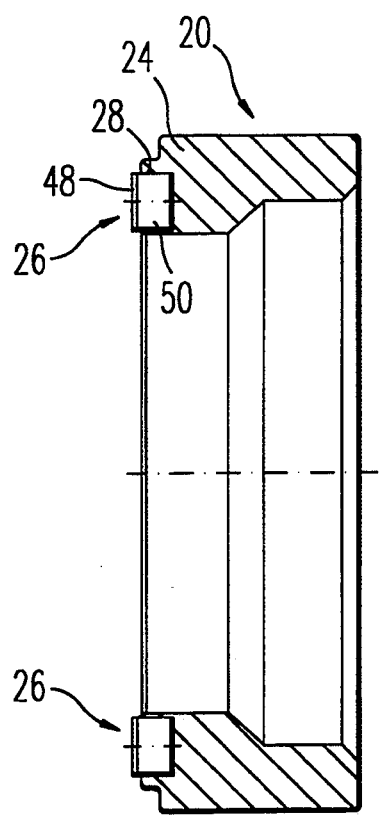
FIG. 3 shows a cross-section taken through the fixed bearing ring of FIG. 2.

FIGS. 2 and 3 illustrate a fixed outer bearing ring 20. As shown, the composite PCD compacts 26 all have the same round cylindrical shape and are equiangularly spaced about the end surface 47 of the support element 24, the cross-sectional shape of which will be apparent from FIG. 3. Each composite compact is secured in its complemental pocket in the element 24 by brazing.

Each composite PCD compact 26 is of the SYNDRILL (trade mark) type and has a PCD compact 48 on a tungsten carbide substrate or backing 50. The PCD compact 48 presents a flat central bearing surface 52 (FIGS. 2 and 7) which is lapped to an extremely smooth state and which is normal to the axis of the bearing assembly.

Figure 7:
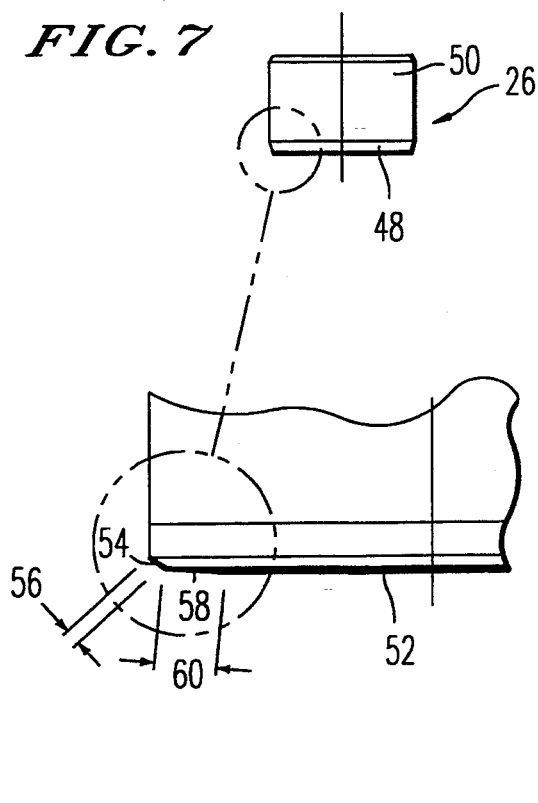
FIG. 7 shows a side view of a single composite PCD compact used in the bearing ring of FIGS. 2 and 3, and an enlarged corner detail.

FIG. 7 shows details of a single composite compact 26. As illustrated, the extreme edge of the PCD compact is formed with a steeply angled chamfer 54. This edge chamfer is provided to blunt the edge of the PCD compact and thereby to prevent chipping or other impact damage to the edge. In the illustrated case, the edge chamfer 54 makes an angle of 45° with the axis of the bearing assembly and has a dimension 56 of 0,3 mm.

In addition to the steeply angled edge chamfer 54, the PCD compact 48 also includes a chamfered edge region 58 which is inclined to the flat bearing surface 52 by a shallow angle, in this case 5°. The dimension 60 in this example is 1,5 mm.

Figure 4:
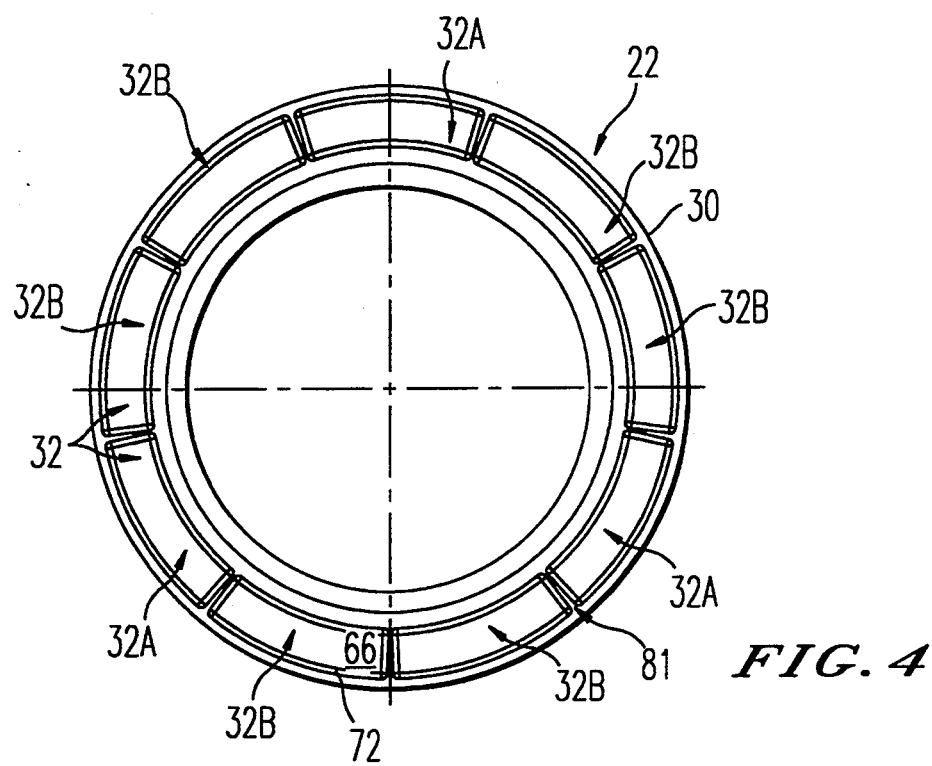
FIG. 4 shows a face view of an inner, rotating bearing ring.
Figure 5:
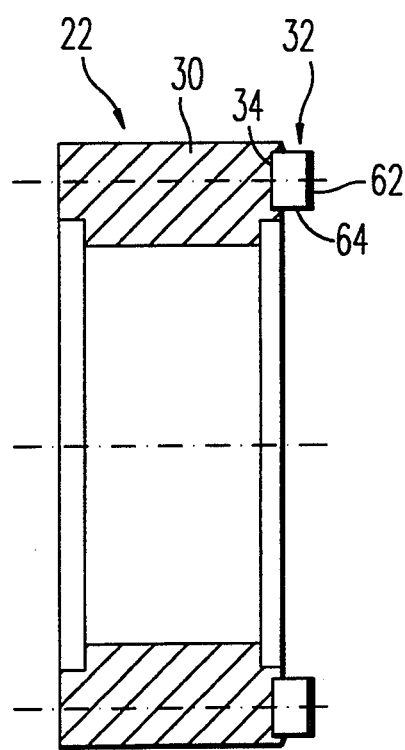
FIG. 5 shows a cross-section taken through the rotating bearing ring of FIG. 4.
Figure 8:
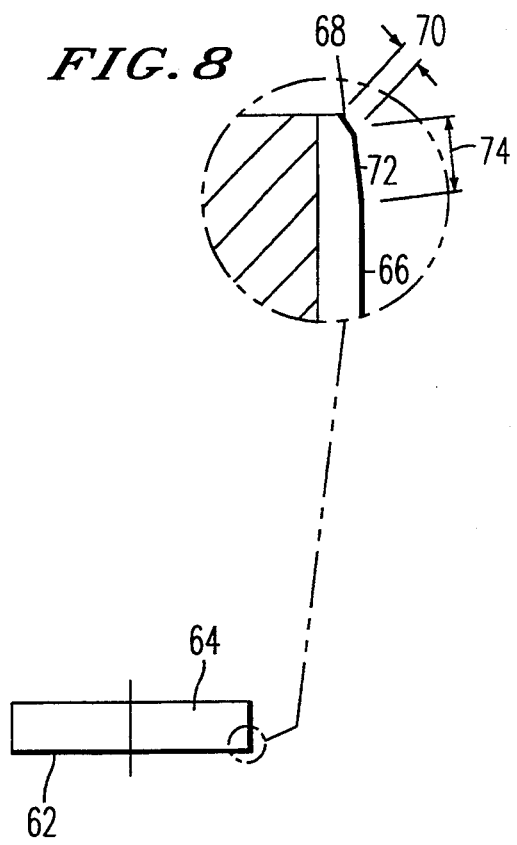
FIG. 8 shows a side view of a single composite PCD compact used in the bearing ring of FIGS. 4 and 5, and an enlarged corner detail.

FIGS. 4, 5 and 8 illustrate corresponding details of an inner bearing ring 22. The composite PCD compacts 32 of this ring are of part-annular shape and are secured by brazing in complementally part-annular pockets in the support element 30. In this case, not all the composite compacts are of the same size. Three of the composite compacts 32, designated 32A, are spaced 60° apart from one another and are slightly longer than the other six composite compacts, designated 32B.

Figure 6:
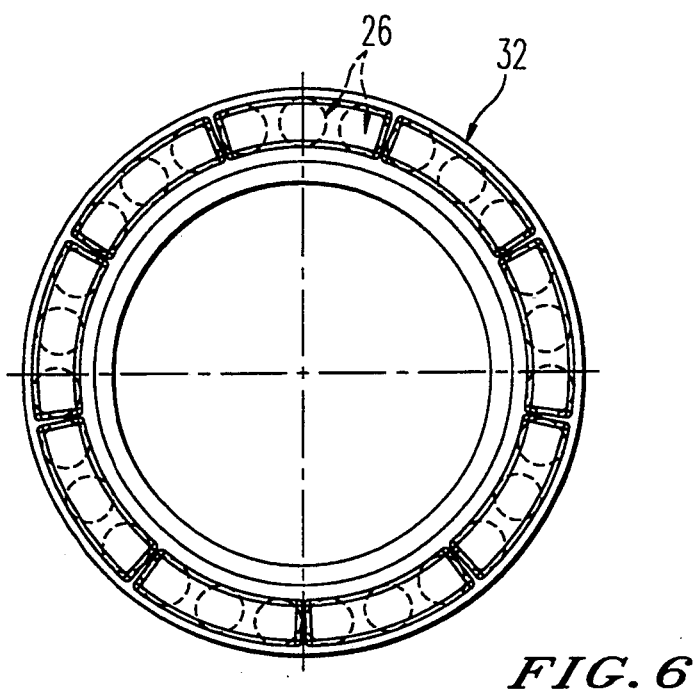
FIG. 6 diagrammatically illustrates the relationship between the composite compacts as they run over one another during operation of the bearing assembly.

The cross-sectional shape of the support element 30 of the bearing ring 24 will be apparent from FIG. 6. Each composite compact 32 has a thin PCD compact 62 carried by a tungsten carbide backing 64. The PCD compact presents a central, flat, extremely smooth bearing surface 66 (FIGS. 4 and 8). At its extreme edges, the composite PCD compact of each composite compact 32 has a steep chamfer 68, with a dimension 70, to prevent edge chipping.

In addition to the steep edge chamfer 68, the PCD compact also includes a chamfered edge region 72 which has a dimension 74 of 1,5 mm and which is inclined to the flat bearing surface 66 by a shallow angle of 5°.

In operation of the diamond bearing assemblies 12, the flat bearing surfaces 52 and 66 run against one another at bearing interfaces 80, taking the axial thrust applied to the shaft 16. Because of their diamond nature, these surfaces have a very low coefficient of friction and are extremely hard, enabling them to take large axial loading without undue damage.

The bearing interfaces 80 are cooled and lubricated during operation by drilling fluid or mud which is exhausted from the downhole motor and which flows axially down the assembly and radially through the gaps 81 between the composite compacts in the bearing rings. A typical drilling fluid path is depicted in FIG. 1 with the numeral 83.

The inclined surfaces defined by the chamfers 58 and 72 do not contact one another during relative rotation between the bearing rings. Thus fluid or mud flowing radially through the gaps 81 can pass over and around these surfaces and apply an advantageous cooling effect to them to prevent excessive heat build-up in the PCD compacts 48 and 62.

In the illustrated embodiment, the composite PCD compacts 26 have a diameter of 12 mm, and the composite PCD compacts 32A and 32B have lengths, measured circumferentially, of 47,5 mm and 39,5 mm respectively.

Thus the circumferential length of each composite compact 32 is substantially greater than the diameter of the composite compacts 26 against which it runs during operation of the diamond bearing assemblies 12. This is illustrated particularly clearly in FIG. 6 in which the composite compacts 26, seen in broken outline, are superimposed on the composite compacts 32 for a particular rotational position of the bearing assembly.

The composite compacts 26 are spaced apart from one another by a few millimeters only. Similarly, the composite compacts 32 are spaced apart from one another by a few millimeters only. As the composite compacts 32 run over the composite compacts 26 during operation of the bearing assemblies there will always be full contact between each composite compact 32 and at least one of the composite compacts 26. Others of the composite compacts 32 make full contact with two or three composite compacts 26.

It is anticipated that the full contact which is achieved at all times by each composite compact 32 will enhance the ability of the diamond bearing assemblies 12 to take the imposed axial loading during drilling.

A further feature of the illustrated compact configurations is that the bearing surfaces 66 of the composite compacts 32 will, for any rotational position, extend over a number of the gaps which exist between the composite compacts 26 and through which the drilling fluid passes radially. Thus a considerable cooling effect is applied to every portion of each bearing surface 66 as the composite compacts 32 run over the composite compacts 26.

In similar fashion, drilling fluid which passes radially through the gaps between the composite compacts 32 will apply a cooling effect to the bearing surfaces 52 of the composite compacts 26. Each composite compact 32 may be considered to "push" a volume of fluid, in the gap ahead of it, over the bearing surfaces 52 of the composite compacts 26, as it rotates. This fluid, which is of course constantly replaced, cools the bearing surfaces of the composite compacts 26 prior to their being contacted by the bearing surface of the composite compact 32 in question. Similarly, the composite compacts 26 may be considered to "push" volumes of fluid over the surfaces of the composite compacts 32.

The cooling of the bearing surfaces provided for by the illustrated design is considered highly advantageous particularly if it is borne in mind that diamond can suffer heat degradation at temperatures above about 750° C. In a specific application, the drilling fluid will be caused to flow radially through the gaps between the composite compacts at a speed typically of the order of 10 m/s with a view to maintaining the temperature at the bearing interfaces well below the critical diamond degradation temperature.

While the present invention is primarily concerned with the shapes and configurations of the relatively rotating composite compacts, It should be noted that the illustrated arrangement of bearing rings 20 and 22 is but one of a number of different possibilities. For instance, there may be one or more intermediate components located between the rings 30. Such intermediate components may possibly incorporate resilient or resiliently mounted alignment pins adapted to locate in pockets in the respective rings 30 to ensure correct axial alignment thereof.

It will also be noted from a comparison of FIGS. 3 and 5 that the composite compacts 32 project further from their bearing rings than do the composite compacts 26.

As mentioned previously, any or all of the edge chamfers 54, 58, 68 and 72 could, if desired, be replaced by chamfers which are curved rather than straight in cross-section.

In other embodiments of the invention, the radial bearing assemblies 36 could be replaced or supplemented by radial bearings which are totally separate and spaced away from the thrust bearings. Also, the tungsten carbide bearing rings could, in other embodiments, be replaced by steel rings. In such cases, the steel rings could be provided with corrosion resistant coatings, such as thermally sprayed tungsten carbide, a ceramic or other hard material. Alternatively, the steel rings could be surface treated, for example by nitriding, to improve corrosion resistance. Although tungsten carbide rings are generally preferred because of their high levels of stiffness and corrosion resistance, steel rings may in certain circumstances be preferable from a cost point of view.

We claim:

1. A diamond thrust bearing assembly for a downhole motor, the assembly comprising at least one set of opposing bearing rings, each bearing ring comprising an annular support element and a plurality of PCD compacts carried in circumferentially spaced relationship by the support element, the PCD compacts presenting opposing bearing surfaces with the bearing surfaces of the compacts of one bearing ring in each set being circumferentially longer than the bearing surfaces of the compacts of the other bearing ring of the set.

2. A diamond thrust bearing assembly according to claim 1 wherein the PCD compacts are provided by composite PCD compacts secured to the bearing rings.

3. A diamond thrust bearing assembly according to claim 2 wherein the composite PCD compacts of one bearing ring in each set are of round cylindrical form, and the composite PCD compacts of the other bearing ring in the set are of elongate, part-annular shape.

4. A diamond thrust bearing assembly according to claim 3 wherein the circumferential length of each part-annular composite compact is substantially greater than the diameter of a round cylindrical composite compact.

5. A diamond thrust bearing assembly according to claim 4 wherein the arrangement of composite compacts in the respective bearing rings is such that the bearing surface of at least one round cylindrical compact always bears fully against the bearing surface of a part-annular composite compact, irrespective of the rotational position of the bearing rings relative to one another.

6. A diamond thrust bearing assembly according to claim 3 wherein the composite compacts are secured in pockets in their respective annular support elements, the part-annular composite compacts projecting further from their pockets than the round cylindrical composite compacts.

7. A diamond thrust bearing assembly according to claim 6 wherein there are, on each bearing ring, circumferential gaps between the composite compacts of that ring.

8. A diamond thrust bearing assembly according to claim 3 wherein each PCD compact has a flat bearing surface circumscribed by a chamfered edge.

9. A diamond thrust bearing assembly according to claim 8 wherein the chamfered edge of each compact includes a shallow chamfer making an angle of less than 45° with the flat bearing surface of the compact.

10. A diamond thrust bearing assembly according to claim 9 wherein the shallow chamfer makes an angle of 1° to 10° with the flat bearing surface of the compact.

11. A diamond thrust bearing assembly according to claim 10 wherein the shallow chamfer makes an angle of about 5° with the flat bearing surface of the compact.

12. A diamond thrust bearing assembly according to claim 9 wherein the shallow chamfer is curved in cross-section.

13. A diamond thrust bearing assembly according to claim 9 wherein the chamfered edge includes, located outwardly of the shallow chamfer, a further chamfer making a steeper angle with the flat bearing surface than the shallow chamfer.

14. A diamond thrust bearing assembly according to claim 13 wherein the further chamfer has a curved shape in cross-section.

15. A diamond thrust bearing assembly according to claim 3 wherein each support element is made of sintered tungsten carbide.

16. A diamond thrust bearing assembly according to claim 15 and comprising two sets of opposing bearing rings.

17. A diamond thrust bearing assembly according to claim 16 wherein PCD compacts with circumferentially longer bearing surfaces are carried by support elements adapted to be mounted on a rotatable driveshaft of the downhole motor while PCD compacts with circumferentially shorter bearing surfaces are carried by support elements adapted to be mounted on a stationary bearing housing.

* * * * *